US009760607B1

(12) United States Patent
Tweedy et al.

(10) Patent No.: US 9,760,607 B1
(45) Date of Patent: Sep. 12, 2017

(54) CALCULATING DOCUMENT QUALITY

(71) Applicant: Amazon Technologies, Inc., Reno, NV (US)

(72) Inventors: Carolyn Grace Tweedy, Seattle, WA (US); Sanjay Varma, Seattle, WA (US); Raymond Robert Ringhiser, Maple Valley, WA (US); Nicole Bethany-Abbott Kelly, Seattle, WA (US); William Sean Burrow, Seattle, WA (US); Todd Goglia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 814 days.

(21) Appl. No.: 14/036,202

(22) Filed: Sep. 25, 2013

(51) Int. Cl.
*G06F 7/00* (2006.01)
*G06F 17/30* (2006.01)

(52) U.S. Cl.
CPC ............................... *G06F 17/3053* (2013.01)

(58) Field of Classification Search
CPC ............ G06F 17/274; G06F 17/30867; G06F 17/30864; G06F 17/3053
USPC ........................................ 707/722, 728, 748
See application file for complete search history.

(56) References Cited

U.S. PATENT DOCUMENTS

| 8,843,479 | B1* | 9/2014 | Bharat | G06F 17/3071 707/724 |
| 2006/0095841 | A1* | 5/2006 | Oikawa | G06F 17/27 715/205 |
| 2007/0156621 | A1* | 7/2007 | Wright | G06Q 30/02 706/48 |
| 2009/0006356 | A1* | 1/2009 | Liao | G06F 17/30867 |
| 2009/0192787 | A1* | 7/2009 | Roon | G06F 17/2715 704/9 |
| 2010/0268708 | A1* | 10/2010 | Zhang | G06F 17/30663 707/726 |
| 2012/0123767 | A1* | 5/2012 | Ananthanarayanan | G06F 17/274 704/9 |
| 2013/0159298 | A1* | 6/2013 | Mason | G06F 17/30867 707/728 |
| 2014/0195977 | A1* | 7/2014 | Chang | G06F 8/38 715/833 |
| 2015/0205767 | A1* | 7/2015 | Stekkelpak | G06F 17/2235 715/207 |

* cited by examiner

*Primary Examiner* — Md. I Uddin
(74) *Attorney, Agent, or Firm* — Thomas | Horstemeyer, LLP

(57) ABSTRACT

Disclosed are various implementations for a content evaluation application. Various component scores are calculated to reflect a variety of attributes of a document. The component scores may reflect a readability score, a word count, user interactions, content timeliness, or other data. An overall quality score is calculated for a document by applying selected weights to the component scores.

18 Claims, 6 Drawing Sheets

CALCULATING DOCUMENT QUALITY

BACKGROUND

Various attributes of a document can be calculated in order to evaluate the document. The attributes may include readability, word count, and rates of user interactions. These discrete attributes may contribute to the overall quality of a document. How these attributes contribute to the overall quality may depend on the intended audience of the document, the language of the document, or other factors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Various attributes of a document can be dynamically calculated from the content of a document. For example, a readability score indicating a reading level can be calculated by applying a readability test or readability algorithm to the document. As another example, a word count can be calculated from the content of the document. Additional attributes can be calculated from user interactions with a document. For example, a viewing rate or viewing count can be calculated from sources such as access logs, transaction logs, or other data. A contact rate can also be calculated according to phone records, email records, or other data indicating contact with a user. User feedback or reviews for the document can also be aggregated to determine a user evaluation. Other attributes may also be calculated for a document.

When presented in isolation, these attributes may provide various data points reflecting the overall quality of a document, but do not provide a concise score or evaluation of the document. A content evaluation application aggregates these various attributes and applies weights to generate an overall quality score for the document. The weights may be manually defined according to a predefined configuration. The weights may also be dynamically determined by performing a statistical analysis or regression analysis on reference documents having known quality scores. Additionally, the weights may be determined according to the intended audience of the document, the language of the document, or other factors.

The quality score for a document may then be used in surfacing content to a user. For example, search results may be sorted according to a quality score. Pools of documents may be filtered according to a quality score threshold. A summary or reference to a document may be accompanied by an indication of the quality score in order to inform a potential viewer. In the following discussion, a general description of the system and its components is provided, followed by a discussion of the operation of the same.

Figure 1:
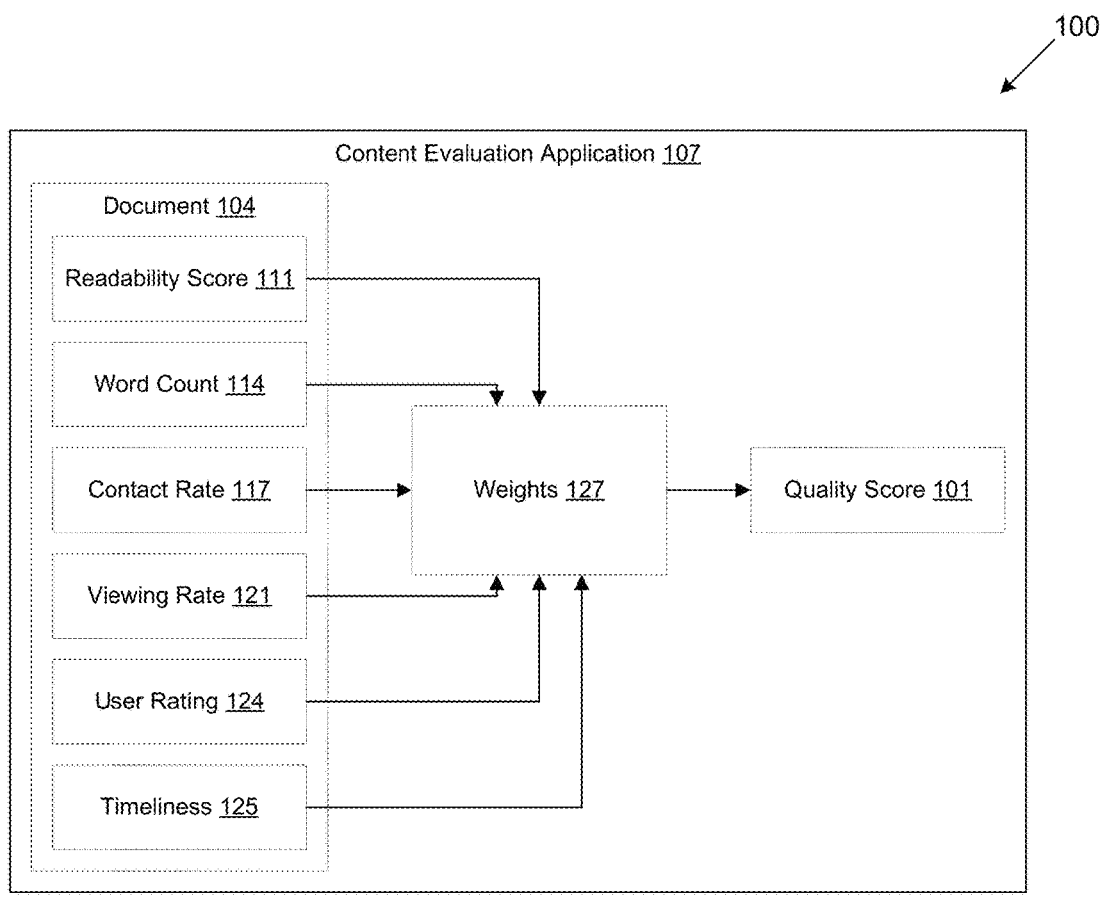
FIG. 1 is a drawing of an example scenario of calculating a quality score of a document according to various implementations of the present disclosure.

With regards to FIG. 1, shown is a drawing depicting an example scenario 100 for calculating a quality score 101 with respect to a document 104 by a content evaluation application 107. In this example scenario, the content evaluation application 107 calculates several values for the document 104, including a readability score 111, a word count score 114, a contact rate 117, a viewing rate 121, a user rating 124, and a timeliness 125 which will be described below in further detail. Various example techniques for calculating these values are discussed further below. Weights 127 may then be applied to one or more of the calculated values to determine an overall quality score 101 for the document.

Figure 2:
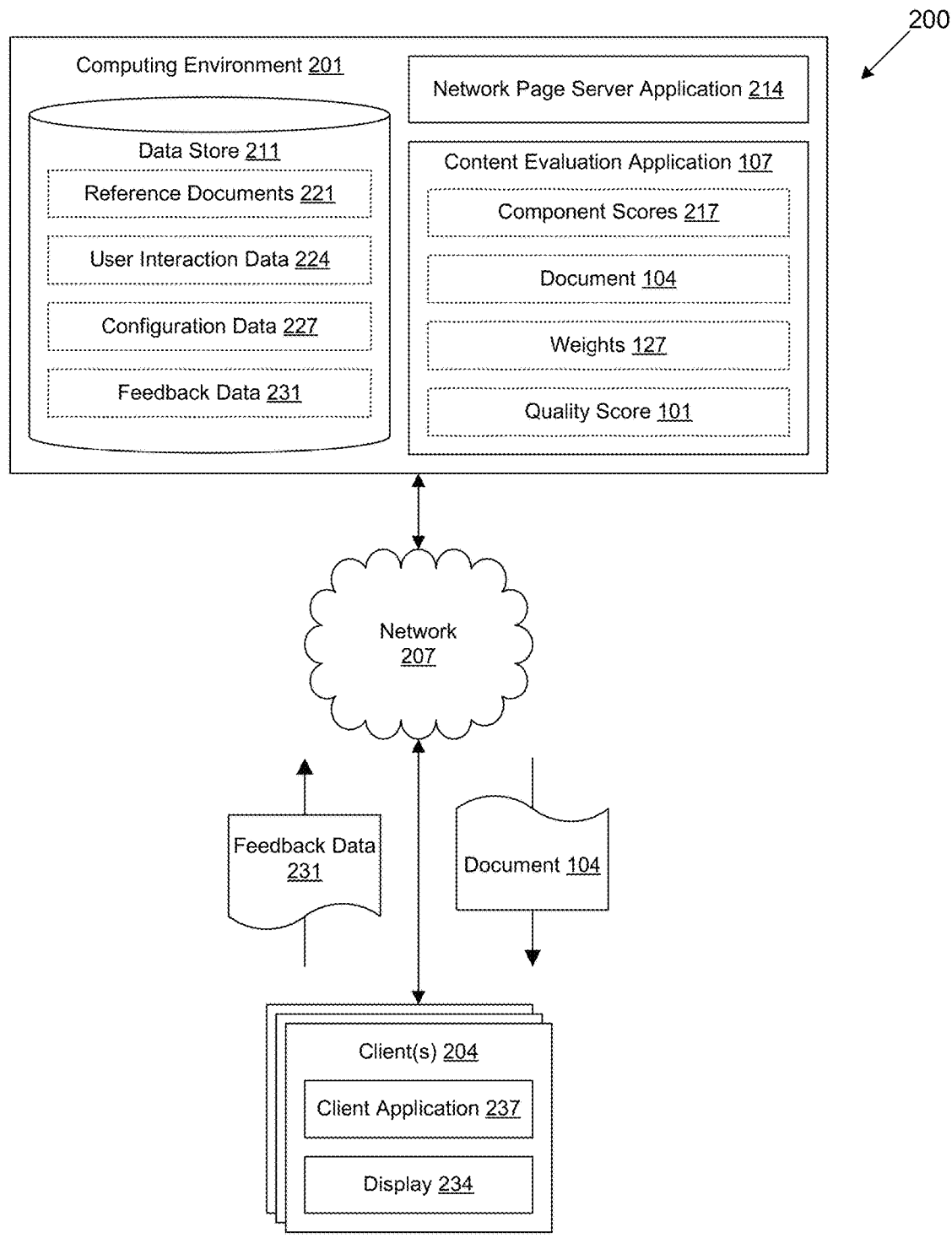
FIG. 2 is a drawing of a networked environment according to various implementations of the present disclosure.

Referring next to FIG. 2, shown is a networked environment 200 according to various implementations. The networked environment 200 includes a computing environment 201, one or more clients 204, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various implementations. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 201, for example, include a content evaluation application 107, a network page server application 214, and other applications, services, processes, systems, engines, or functionality not discussed in detail herein. The content evaluation application 107 is executed to calculate a quality score 101 for a document 104. A document 104 is any data including at least a portion of text or string data. A document 104 may include, for example, a network page such as a web page, an eBook, a text file, data encoded by a word processing application, or other data as can be appreciated. A quality score 101 comprises a rating, grade, or other evaluation reflecting the quality of a document 104 as a function of various aggregated component scores 217 calculated with respect to the document 104. To this end, the content evaluation application 107 is configured to apply one or more weights 127 to the component scores 217 to calculate the quality score 101 for the document 104.

A network page server application 214 is configured to encode network pages such as web pages to facilitate the communication of data to the client 204 via the network 207. The network pages may encode data such as, for example, documents 104, quality scores 101, or other data.

The data stored in the data store 211 includes, for example, reference documents 221, user interaction data 224, configuration data 227, feedback data 231, and potentially other data. Reference documents 221 are a data set of documents 104 upon which a statistical correlation or regression analysis can be performed by the content evaluation application 107 as will be described below. Reference documents 221 may include, for example, documents 104 having a known quality score 101, documents 104 corresponding to a quality score 101 baseline or threshold, or another document 104.

User interaction data 224 indicates previous interactions with documents 104 by a client 204. This may include for example, indications of a document 104 being viewed by a client 204, saved by a client 204, edited or modified by a client 204, or indications of other actions. For example, user interaction data 224 may indicate a viewing of a network page embodying a document 104 by a client 204. User interaction data 224 may also indicate selections of navigation elements such as links within a document 104, actions taken prior to or after viewing or modifying a document 104, or other interactions. In embodiments in which a document 104 corresponds to a network page such as a web page, user interaction data 224 may indicate a browsing history for a user prior to or subsequent to viewing a respective document 104. User interaction data 224 may also indicate actions by a user with respect to a document 104 via other services or platforms such as social networking services, social messaging services, or other services. For example, user interaction data 224 may indicate a sharing, a "liking", or a promotion of a document on a social networking service. Other interactions may also be indicated in user interaction data.

Configuration data 227 includes data defining weights 127 to be applied to component scores 217 by the content evaluation application 107. The weights 127 defined in configuration data 227 may be obtained from a client 204, defined as a default or standard weight 127, or otherwise defined. The weights 127 may be defined in configuration data 227 with respect to a component score 217 to which it is applied. The weights 127 may also be defined in configuration data 227 with respect to a document 104 type or category. The weights 127 may be further defined with respect to a user account, or otherwise defined. Configuration data 227 may also define selections of reference documents 221 for the purposes of generating weights 127, component scores 217, or quality scores 101 as will be described in further detail. Configuration data 227 may also define other attributes, settings, or criteria accessed by the content evaluation application 107 as can be appreciated.

Feedback data 231 includes data reflecting a rating, review, critique, or other evaluation of a document 104. Feedback data 231 may include, for example, user reviews obtained from a client 204. Feedback data 231 may also include user generated ratings for a document 104. Feedback data 231 may further include suggested modifications to documents 104, indicia of errors such as typos or formatting errors, or other data.

The client 204 is representative of a plurality of client devices that may be coupled to the network 207. The client 204 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 204 may include a display 234. The display 234 may comprise, for example, one or more devices such as liquid crystal display (LCD), gas plasma-based flat panel displays, organic light emitting diode (OLED) displays, electrophoretic ink (E ink) displays, LCD projectors, or other types of display devices, etc.

The client 204 may be configured to execute various applications such as a client application 237 and/or other applications. The client application 237 may be executed in a client 204, for example, to access network content served up by the computing environment 201 and/or other servers, thereby rendering a user interface on the display 234. To this end, the client application 237 may comprise, for example, a browser, a dedicated application, etc., and the user interface may comprise a network page, an application screen, etc. The client 204 may be configured to execute applications beyond the client application 237 such as, for example, email applications, social networking applications, word processors, spreadsheets, and/or other applications.

Next, a general description of the operation of the various components of the networked environment 200 is provided. To begin, the content evaluation application 107 selects a document 104 for calculating a quality score 101. In some implementations, this may be performed according to an input from a client 204 selecting a document 104. In other implementations, the document 104 may be one of a pool of documents 104 iterated upon by the content evaluation application 107 in order to calculate quality scores 101 for the respective documents 104. Selecting the document 104 may be performed at a predefined interval, or responsive to another event.

The content evaluation application 107 then calculates component scores 217 for the selected document 104. The component scores 217 may include a readability score 111 for the document. The readability score 111 may be generated as a function of a word complexity, word diversity, sentence length, sentence structure, or other criteria. In such an implementation, the readability score 111 may be generated by applying a readability test or readability function to the document 104. Such readability tests may include, for example, the Automated Readability Index, the Coleman-Liau Index, the Dale-Chall Readability Formula, a Flesh-Kincaid readability test, a Simple Measure of Gobbledygook (SMOG), or other readability test as can be appreciated.

In some implementations, the readability score 111 may correspond to the result of a readability test. For example, a lower reading level may be preferential to a higher reading level in order to ensure that the content of a document 104 is understandable. In such an implementation, a readability score 111 may decrease as a reading level indicated by a readability test increases. In other implementations, a readability score 111 may be calculated according to a degree to which a reading level indicated in a readability test diverges from a threshold. For example, a document 104 may have a preferred reading level corresponding to an eleventh-grade education. The readability score 111 may then be decreased according to a degree to which the reading level of the document 104 falls above or below the eleventh-grade reading level. The threshold may also correspond to the reading level of another document 104, to promote consistency of reading levels amongst multiple documents 104. The readability score 111 may also be generated by a readability test by another approach.

The readability score 111 may also be calculated as a function of a proofreading algorithm, such as a spell-check algorithm, a grammar-check algorithm, an antecedent basis checking algorithm, or another algorithm. For example, a readability score 111 may be reduced according to a number of proofreading errors detected by the proofreading algorithm. The readability score 111 may also be calculated by another approach.

The component scores 217 may also include a word count score 114 calculated as a function of a number of words included in the document 104. A word count score 114 may be calculated as a function of a predefined word count threshold. For example, a word count score 114 may decrease as a word count of a document 104 increases above the threshold. The threshold may include a predefined threshold. The threshold may also be generated as a function of word counts of other documents 104. The word count score 114 may also be calculated by another approach.

Component scores 217 may further include user interaction scores generated as a function of user interaction data 224. A user interaction score may be calculated as a function of a viewing rate 121, indicating a quantity or a frequency of viewings of a document 104 by a client 204. In some implementations, the document 104 may correspond to a help page or other informative document 104 intended to provide support to a user prior to or in lieu of communicating with a customer support representative. In such an implementation, a user interaction score may also be calculated as a function of a contact rate 117 indicating a degree to which a user contacts a customer service representative after viewing a document. A respective component score 217 may increase as a contact rate 117 decreases, indicating that the document 104 was helpful to a user and eliminated the need to contact customer support.

User ratings 124 may also be included as a component score 217. For example, the content evaluation application 107 may aggregate feedback data 231 such as reviews or ratings and generate an aggregate user rating 124 according to the feedback data 231. Component scores 217 may also include a timeliness 125 of a document 104, corresponding to how recently the document 104 was last created, updated, or otherwise modified. Component scores 217 may also be generated according to other data, including social media sharing data, product sales or conversion data, or other data.

After calculating the component scores 217, the content evaluation application 107 selects weights 127 to be applied to the component scores 217. Weights 127 are coefficients multiplied by a respective component score 217. In some implementations, the content evaluation application 107 selects weights 127 according to configuration data 227. The configuration data 227 may define a weight 127 as corresponding to a component score 217 to which it is applied.

The weights 127 may be selected according to a language or intended audience of the document 104. For example, it may be assumed that a Japanese audience values conciseness of a document 104. Therefore, a document 104 in Japanese or for distribution to Japan may have a greater weight 127 applied to a word count score 114.

In other implementations, the content evaluation application 107 may dynamically generate the weights 127 to be applied to component scores 217 using reference documents 221 having a known quality score 101. The content evaluation application 107 may calculate component scores 217 for the reference documents 221 as described above. The content evaluation application 107 may then perform a regression analysis on the known quality scores 101 and component scores 217 to generate the weights 127 corresponding to the component scores 217.

In further implementations, the content evaluation application 107 may perform a statistical correlation or other statistical analysis on reference documents 221 having known respective quality scores 101, weights 127, and component scores 217. The content evaluation application 107 may then apply the statistical analysis to determine which weights 127 have a significance above a threshold in generating the respective quality scores 101. The content evaluation application 107 would then select weights 127 for a document 104 as the significant weights 127. The content evaluation application 107 may also generate weights 127 for a document as a function of the significant weights 127. Weights 127 may also be selected by another approach.

In implementations in which the content evaluation application 107 generates weights 127 as a function of reference documents 221, the content evaluation application 107 may filter the pool of reference documents 221 used. For example, the pool of reference documents 221 may be filtered according to a language of the document 104. The content evaluation application 107 may then filter the reference documents 221 to those of the reference documents 221 sharing a language with the document 104. The content evaluation application 107 may also filter the reference documents 221 to those reference documents 221 having a language corresponding to a similar region as the language of the document 104. For example, for a document 104 in German, the content evaluation application 107 may filter reference documents 221 not having a Germanic language, a European language, or other language. The reference documents 221 may also be filtered according to other criteria, such as an intended audience of a document 104, subject matter of a document 104, a technical level of content included in a document 104, or other criteria.

In other implementations, the content evaluation application 107 may generate weights 127 according to a defined selection of reference documents 221. For example, a selection of one or more reference documents 221 may be obtained from a client 204 or from another source. As another example, a selection of one or more reference documents 221 may be encoded as configuration data 227. The selection of reference documents 221 may be defined with respect to an individual document 104, a classification or group of documents 104, a document 104 type or content subject, or by another approach.

After selecting the weights 127, the content evaluation application 107 then calculates a quality score 101 for the document 104 by applying the selected weights 127 to the respective component scores 217. This may be performed by calculating a sum, average, or other aggregate value of the weighted component scores 217. The quality score 101 for a document 104 may also be calculated by another approach.

In some implementations, after calculating the quality score 101 for the document 104, the content evaluation application 107 may determine if the quality score 101 meets or exceeds a threshold. The threshold may be defined in configuration data 227 or by another approach. The threshold may also be dynamically calculated as a function of quality scores 101 of other documents 104, such as a minimum quality score 101, average quality score 101, median quality score 101 or other quality score 101.

If the quality score 101 of the document 104 fails to meet or exceed the threshold, the content evaluation application 107 may determine one or more suggested modifications to the document 104 to increase the quality score 101. In some implementations, this may include determining which component scores 217 or weighted component scores 217 fall below respective thresholds, and suggesting modifying the document 104 to improve a corresponding component score 217. In other implementations, this may include determining a component score 217 having a highest weight 127, and suggesting a modification to improve that component score 217 in order to increase the quality score 101. Suggested modifications to a document 104 may also be determined by another approach.

Various operations may then be performed with respect to a document 104 having a quality score 101. For example, the document 104 may be stored as a reference document 221 for generating quality scores 101 for other documents 104. As another example, a network page server application 214 may encode a visual indicator of a quality score 101 for a document 104, a reference to a document 104 such as a navigation aid or link.

In this example, a list of documents 104 may include an indication of the quality score 101 for a respective document 104 in the list. The indication of the quality score 101 may be a numeric or alphanumeric representation of the quality score 101. The indication of the quality score 101 may also include an image having a color, transparency, shape, or content corresponding to the quality score 101. For example, a document 104 having a high quality score 101 may correspond to a smiling face icon, while a document with a lower quality score 101 may correspond to a frowning face icon. Entries in a list of documents 104 may also be highlighted or otherwise color coded according to a quality score 101.

In other implementations, the content evaluation application 107 may be configured to generate a report embodying the quality scores 101 of one or more documents 104. For example, a content evaluation application 107 may generate a report for individual documents 104 comprising a help system, documentation system, or other related series of documents 104. The report may include visual indicators of quality scores 101 as described above.

In further implementations, a network page server application 214 generating search results or lists of documents 104 may sort or filter documents 104 according to quality scores 101. For example, a network page server application 214 may encode references to documents 104 as search results which are sorted at least in part according to the respective quality scores 101. As another example, search results for documents 104 may exclude documents 104 having a quality score 101 falling below a threshold. Other actions may also be taken with respect to documents 104 having quality scores 101.

Figure 3A:
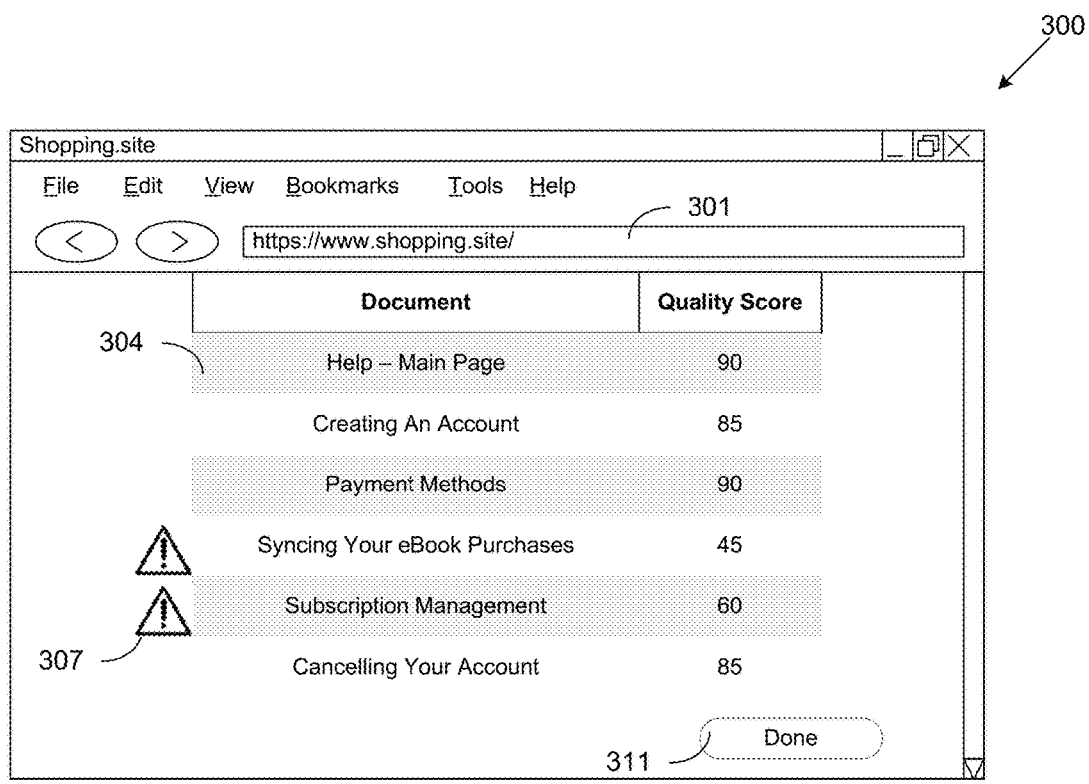
FIGS. 3A and 3B are pictorial diagram of example user interfaces rendered by a client in the networked environment of FIG. 2 according to various implementations of the present disclosure.

Turning now to FIG. 3A, shown is an example user interface 300 depicting a table of multiple documents 104 (FIG. 1) and corresponding quality scores 101 (FIG. 1) encoded for rendering by a client 204 (FIG. 2). In some implementations, the example user interface 300 may comprise a network page encoded by a network page server application 214 (FIG. 2) for rendering by a browser client application 237 (FIG. 1). In other implementations, the example user interface 300 may comprise data encoded for rendering by a dedicated client application 237.

Item 301 is a Uniform Resource Locator (URL) directed to functionality executed in the computing environment 201 (FIG. 2) such as a network page server application 214 or other functionality. Item 304 is a table of documents 104 and respective quality scores 101. Alternating rows of the table are highlighted to improve readability. Item 307 is an icon indicating that the documents 104 listed in the corresponding row of the table have quality scores 101 falling below a threshold. Item 311 is a button which, when pressed, initiates a navigation to another network page or content served by the computing environment 201.

Figure 3B:
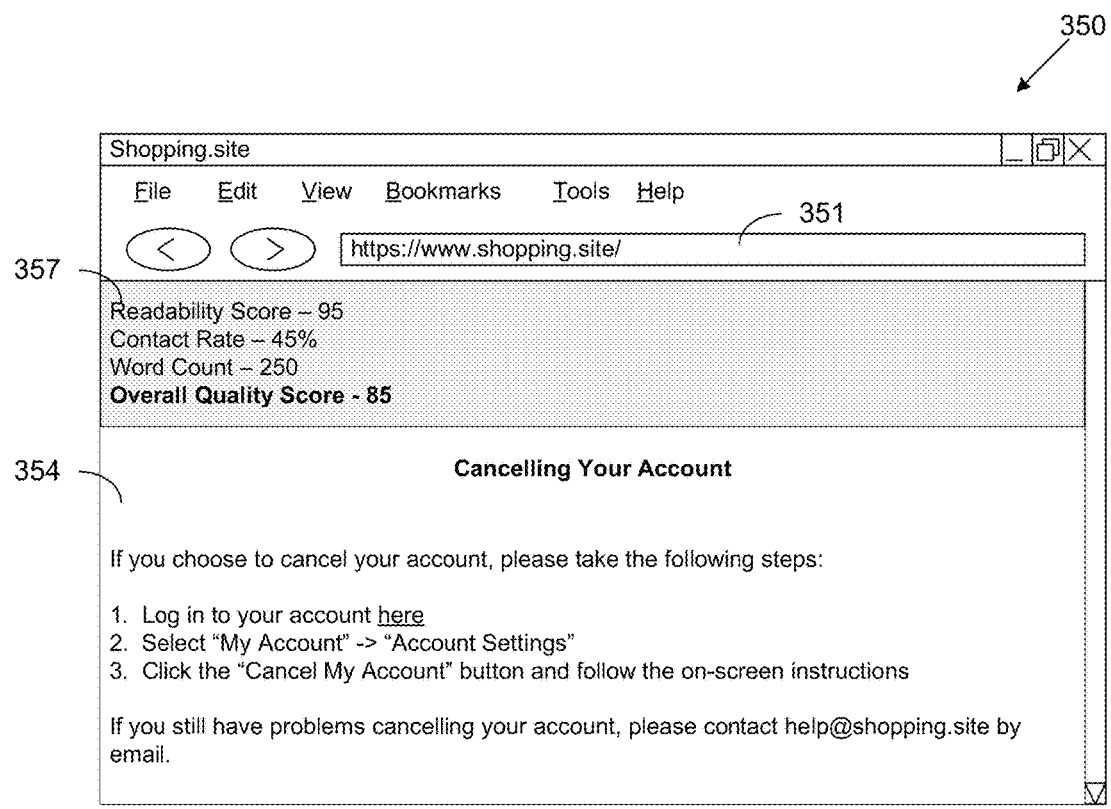

Moving on to FIG. 3B, shown is an example user interface 350 encoded for rendering by a client 204 (FIG. 2) rendering a document 104 (FIG. 1) with a header encoding quality scores 101 (FIG. 1) and component scores 217 (FIG. 2). In some implementations, the example user interface 350 may comprise a network page encoded by a network page server application 214 (FIG. 2) for rendering by a browser client application 237 (FIG. 2). In other implementations, the example user interface 350 may comprise data encoded for rendering by a dedicated client application 237.

Item 351 is a Uniform Resource Locator (URL) directed to functionality executed in the computing environment 201 (FIG. 1) such as a network page server application 214 or other functionality. Item 354 is a rendering of a document 104 corresponding to a help page for cancelling a user account of an electronic commerce site. Item 357 is a header encoding component scores 217 and a quality score for the document 104 depicted in item 354. Item 357 may be encoded in the same user interface component as item 354, such as a title or header portion of a network site. Item 357 may also be encoded as a user interface component distinct from item 354, such as a frame, window, or other user interface component.

Figure 4:
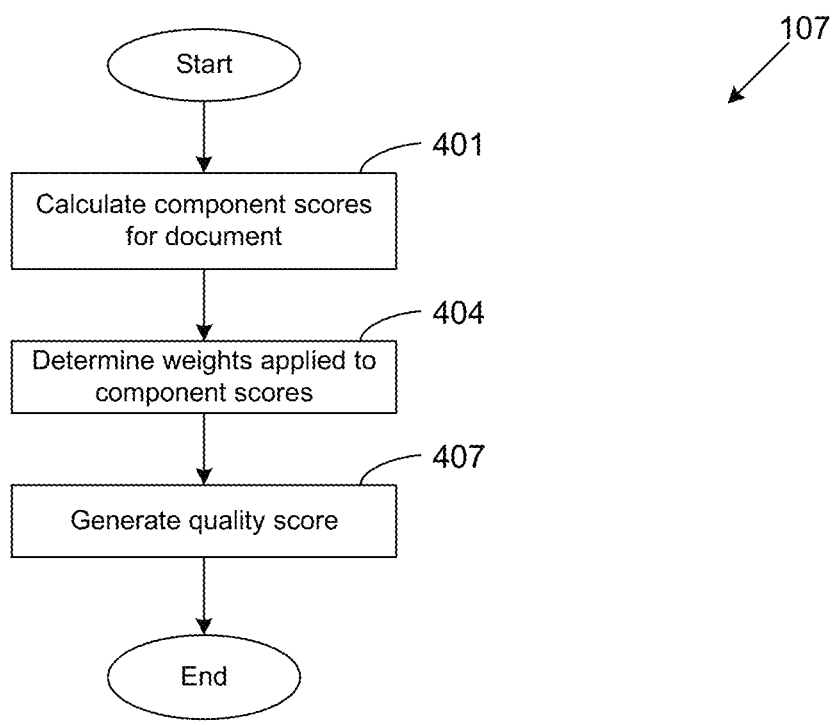
FIG. 4 is a flowcharts illustrating and example of functionality implemented as portions of a content evaluation application executed in a computing environment in the networked environment of FIG. 2 according to various implementations of the present disclosure.

Referring next to FIG. 4, shown is a flowchart that provides one example of the operation of a portion of the content evaluation application 107 according to various implementations. It is understood that the flowchart of FIG. 4 provides merely an example of the many different types of functional arrangements that may be employed to implement the operation of the portion of the content evaluation application 107 as described herein. As an alternative, the flowchart of FIG. 4 may be viewed as depicting an example of elements of a method implemented in the computing environment 201 (FIG. 2) according to one or more implementations.

Beginning with box 401, the content evaluation application 107 calculates component scores 217 (FIG. 2) for a document 104 (FIG. 1). The component scores 217 may include a readability score 111 (FIG. 1) for the document. The readability score 111 may be generated by applying a readability test or readability function to the document 104. Such readability tests may include, for example, the Automated Readability Index, the Coleman-Liau Index, the Dale-Chall Readability Formula, a Flesh-Kincaid readability test, a Simple Measure of Gobbledygook (SMOG), or other readability test as can be appreciated.

In some implementations, the readability score 111 may correspond to the result of a readability test. In other implementations, a readability score 111 may be calculated according to a degree to which a reading level indicated in a readability test diverges from a threshold. The threshold may also correspond to the reading level of another document 104, to promote consistency of reading levels amongst multiple documents 104. The readability score 111 may also be generated by a readability test by another approach.

The readability score 111 may also be calculated as a function of a proofreading algorithm, such as a spell-check algorithm, a grammar-check algorithm, an antecedent basis checking algorithm, or another algorithm. For example, a readability score 111 may be reduced according to a number of proofreading errors detected by the proofreading algorithm. The readability score 111 may also be calculated by another approach.

The component scores 217 may also include a word count score 114 (FIG. 1) calculated as a function of a number of words included in the document 104. Component scores 217 may further include user interaction scores generated as a function of user interaction data 224 (FIG. 2). A user interaction score may be calculated as a function of a viewing rate 121 (FIG. 1) or a contact rate 117 (FIG. 1) in some implementations.

Additionally, calculating a component score 217 may include calculating a user rating 124 (FIG. 1) for a document 104. For example, the content evaluation application 107 calculate a user rating 124 as an aggregate value such as a sum, average, median, or other aggregate value. The aggregate value may be calculated as a function of feedback data 231 obtained from clients 204 (FIG. 1). Such feedback data 231 may include reviews, ratings, social media sharing rates, indications of a preference or "liking" of a document 104, or other data.

Component scores 217 may also include a timeliness 125 of a document 104, corresponding to how recently the document 104 was last created, updated, or otherwise modified. Component scores 217 may also be generated according to other data.

Next, in box 404, the content evaluation application 107 determines weights 127 (FIG. 1) to be applied to the component scores 217. In some implementations, this comprises accessing configuration data 227 (FIG. 2) defining weights 127 to be applied to a corresponding component score 217. The weights 127 may be selected according to a language or intended audience of the document 104. For example, it may be assumed that an American audience values timeliness of a document 104. Therefore, a document 104 in English or for distribution to the United States may have a greater weight 127 applied to a timeliness 125.

In other implementations, the content evaluation application 107 may dynamically generate the weights 127 to be applied to component scores 217 using reference documents 221 (FIG. 2). The reference documents 221 may be a defined selection of reference documents 221 obtained from a client 204, loaded from configuration data 227, or otherwise accessed. The reference documents 221 may also be a filtered pool of reference documents 221.

For example, the pool of reference documents 221 may be filtered according to a language of the document 104. The reference documents 221 may also be selected according to other criteria, such as an intended audience of a document 104, subject matter of a document 104, a technical level of content included in a document 104, or other criteria. For example, in order to select weights 127 for a document 104 in a collection of help pages, the reference documents 221 may include other documents 104 in the collection of help pages.

Calculating weights 127 according to reference documents 221 may include performing a regression analysis on reference documents 221 having known quality scores 101. For example, a regression analysis may be iteratively performed on a pool of reference documents 221 as new documents 104 are added to the reference documents 221. This allows the algorithm to generate the weights 127 to be dynamically retrained.

Calculating weights 127 according to reference documents 221 may also include performing a statistical correlation on reference documents having known weights 127 used to generate known corresponding quality scores 101. The statistical correlation may determine which weights 127 and component scores 217 are statistically significant in calculating quality scores 101. The statistically significant weights 127 may then be applied to the document 104. The content evaluation application 107 may also determine weights 127 for a document 104 by another approach.

After determining the weights 127 to be applied to the component scores 217, the content evaluation application 107 calculates the quality score 101 for the document 104 in box 407. This may be performed by calculating a sum, average, or other aggregate value of the weighted component scores 217. The quality score 101 for a document 104 may also be calculated by another approach.

Figure 5:
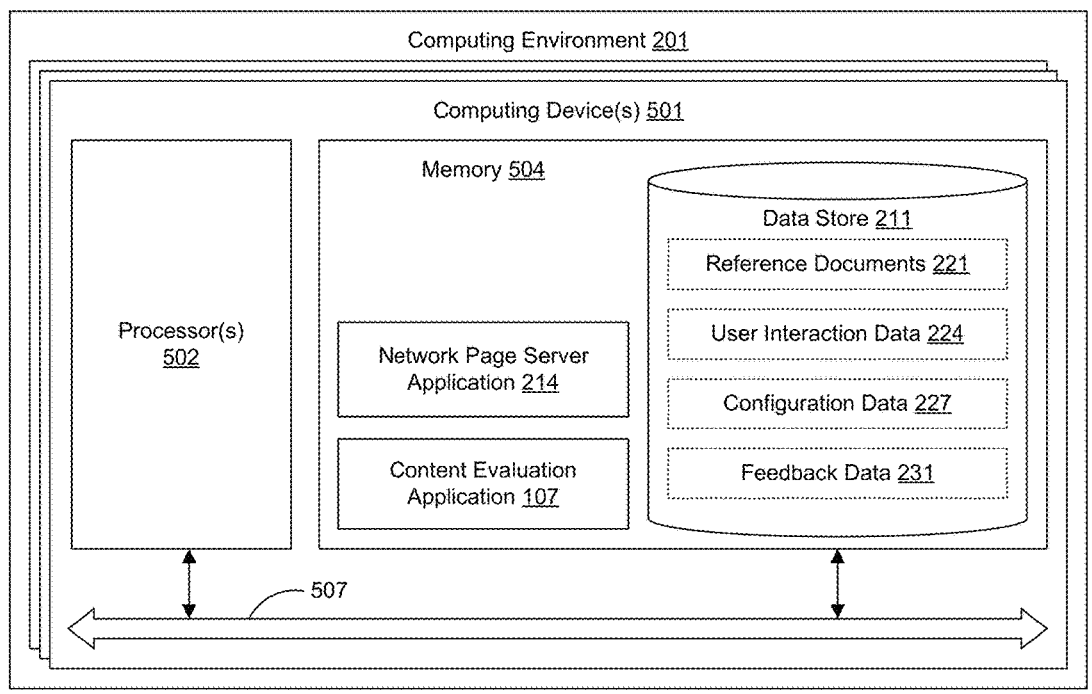
FIG. 5 is a schematic block diagram that provides one example illustration of a computing environment employed in the networked environment of FIG. 2 according to various implementations of the present disclosure.

With reference to FIG. 5, shown is a schematic block diagram of the computing environment 201 according to an implementation of the present disclosure. The computing environment 201 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are a content evaluation application 107, a network page server application 214, and potentially other applications. Also stored in the memory 504 may be a data store 211 storing reference documents 221, user interaction data 224, configuration data 227, feedback data 231 and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the content evaluation application 107, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the content evaluation application 107. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some implementations, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a content evaluation application 107, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content evaluation application 107, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

It should be emphasized that the above-described implementations of the present disclosure are merely possible examples of implementations set forth for a clear understanding of the principles of the disclosure. Many variations and modifications may be made to the above-described implementation(s) without departing substantially from the spirit and principles of the disclosure. All such modifications and variations are intended to be included herein within the scope of this disclosure and protected by the following claims.

Therefore, the following is claimed:

1. A method comprising:
    receiving, by a server computing device from a client computing device over a network, a network request for a network page;
    associating, by the server computing device, one of a plurality of user accounts with the network request;
    retrieving, by the server computing device over the network, the network page from a network page server;
    calculating, by the server computing device, a plurality of component scores for the network page including a readability score, a word count, and a timeliness score;
    determining, by the server computing device, a plurality of weights specified by configuration data associated with the user account, each of the plurality of user accounts associated with configuration data;
    generating, by the server computing device, a quality score for the network page by multiplying the plurality of weights specified by the configuration data associated with the user account to the plurality of component scores;
    calculating, by the server computing device, a dynamic threshold value as a function of aggregate values of quality scores of a plurality of other network pages;
    responsive to the quality score falling below the dynamic threshold value, determining, by the server computing device, at least one suggested modification to the network page to improve the quality score based on the plurality of weights specified by the configuration data associated with the user account;
    encoding, by the server computing device, for rendering by the client computing device a report embodying at least the quality score or the at least one suggested modification; and
    generating, by the server computing device, search results comprising a list of network pages, wherein the list of network pages is sorted according to respective quality scores associated with the network pages in the list.

2. The method of claim 1, wherein the configuration data associated with the user account specifies a weight to be applied for a particular language of the network page.

3. The method of claim 1, wherein the plurality of component scores further includes a user rating score, the method further comprising aggregating feedback data to generate the user rating score, wherein the feedback data comprises a user feedback of the network page.

4. A system, comprising:
    at least one computing device;
    a content evaluation application executed in the at least one computing device, the content evaluation application configured to at least:
        receive from a client computing device over a network, a network request for a network page;
        associate one of a plurality of user accounts with the network request;
        retrieve the network page from a network page server over the network;
        calculate a plurality of component scores for the network page including a user interaction score, wherein the user interaction score is a function of user interaction data, the user interaction data comprising at least data representing previous interactions with the network page by at least one viewer of the network page;
        determine a plurality of weights to be multiplied to the plurality of component scores from configuration data associated with the user account, each of the plurality of user accounts associated with configuration data;
        generate a quality score for the network page by applying the plurality of weights specified by the configuration data associated with the user account to the plurality of component scores;
        encode for rendering by the client computing device a report embodying at least the quality score within a header portion of the network page;
        determine a dynamic threshold value as a function of aggregate values of quality scores of a plurality of other network pages; and
        responsive to the quality score falling below the dynamic threshold value, output a one of the plurality of component scores to be improved; and
    a network page server application executed in the at least one computing device, the network page server application configured to generate search results comprising a list of network pages, wherein the list of network pages is sorted according to respective quality scores associated with the network pages in the list.

5. The system of claim 4, wherein the user interaction score is calculated as a function of a quantity of views of the network page.

6. The system of claim 5, wherein the network page is a help document, and wherein the user interaction score is further calculated as a function of a quantity of support contacts performed after viewing the help document.

7. The system of claim 4, wherein the network page is one of a plurality of network pages, and the component scores are calculated as a function of another plurality of component scores corresponding to another of the plurality of network pages.

8. The system of claim 4, wherein the content evaluation application is further configured to obtain a definition of at least a portion of the plurality of weights from the client computing device.

9. The system of claim 4, wherein the plurality of component scores further includes a user rating score, wherein the content evaluation application is further configured to aggregate feedback data to generate the user rating score, wherein the feedback data comprises a user feedback of the network page.

10. The system of claim 4, wherein the network page is one of a plurality of network pages, and the content evaluation application is further configured to perform a statistical correlation on the plurality of network pages and a corresponding plurality of quality scores to identify a subset of the plurality of component scores that are more statistically significant with respect to a remainder of the component scores.

11. The system of claim 4, wherein the user interaction data further comprises a browsing history for the at least one viewer subsequent to viewing the network page.

12. A method, comprising:
receiving, by a server computing device from a client computing device over a network, a network request for a network page;
associating, by the server computing device, one of a plurality of user accounts with the network request;
retrieving, by the server computing device, the network page from a network page server over the network;
calculating, by the server computing device, for a document, a plurality of component scores including a readability score, a word count, or a timeliness score, wherein the readability score is calculated by applying a readability test to the network page, wherein the readability score is based at least in part on a word complexity, a word diversity, or a sentence length;
determining, by the server computing device, a plurality of weights to be multiplied to the plurality of component scores based at least in part on configuration data associated with the user account, each of the plurality of user accounts associated with configuration data;
calculating, by the server computing device, a dynamic threshold value as a function of a plurality of quality scores of other network pages;
generating, by the server computing device, a quality score for the network page by applying the plurality of weights to the plurality of component scores; and
encoding, by the server computing device, for rendering by the client computing device a report embodying at least the quality score within a user interface component distinct from the network page, wherein responsive to the quality score of the network page falling below the dynamic threshold value, the report provides at least one suggested modification to the network page to improve the quality score.

13. The method of claim 12, wherein the plurality of component scores is a first plurality of component scores, and further comprising:
identifying at least one reference document from the configuration data associated with the user account;
performing, by the server computing device, a regression analysis on the at least one reference document to determine a second plurality of component scores of the at least one reference document contributing to a quality score of the at least one reference document; and
wherein the plurality of weights are determined as a function of the second plurality of component scores.

14. The method of claim 13, wherein the at least one reference document is further identified based on a language of the network page.

15. The method of claim 13, further comprising including the network page as a reference document in the configuration data when the quality score for the network page is above the dynamic threshold value.

16. The method of claim 12, further comprising determining, by the server computing device, the modification to the network page to increase the quality score of the network page.

17. The method of claim 12, wherein the plurality of component scores comprises the readability score, a word count, and timeliness score.

18. The method of claim 12, wherein user interface component comprises a graphical window.

* * * * *

UNITED STATES PATENT AND TRADEMARK OFFICE
CERTIFICATE OF CORRECTION

PATENT NO. : 9,760,607 B1  
APPLICATION NO. : 14/036202  
DATED : September 12, 2017  
INVENTOR(S) : Tweedy et al.

Page 1 of 1

It is certified that error appears in the above-identified patent and that said Letters Patent is hereby corrected as shown below:

In the Claims

At Column 16, Lines 30-31, in Claim 17, delete "component scores comprises the readability score, a word count, and timeliness score", and replace with --component scores comprises the readability score, the word count, and the timeliness score--

AND

At Column 16, Line 32, in Claim 18, delete "The method of claim 12, wherein user interface" and replace with --The method of claim 12, wherein the user interface--

Signed and Sealed this  
Thirteenth Day of February, 2018

Andrei Iancu  
*Director of the United States Patent and Trademark Office*